US011994264B2

(12) United States Patent
Risthaus

(10) Patent No.: US 11,994,264 B2
(45) Date of Patent: May 28, 2024

(54) LIGHTING DEVICE FOR A MOTOR VEHICLE HEADLIGHT WITH A FIRST OPTICAL COMPONENT AND SECOND OPTICAL SYSTEM

(71) Applicant: HELLA GmbH & Co. KGaA, Lippstadt (DE)

(72) Inventor: Piet Risthaus, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/123,084

(22) Filed: Mar. 17, 2023

(65) Prior Publication Data

US 2023/0228397 A1 Jul. 20, 2023

Related U.S. Application Data

(63) Continuation of application No. PCT/EP2021/074755, filed on Sep. 9, 2021.

(30) Foreign Application Priority Data

Sep. 18, 2020 (DE) ..................... 10 2020 124 423.1

(51) Int. Cl.

| | |
|---|---|
| ***F21S 41/365*** | (2018.01) |
| ***F21S 41/147*** | (2018.01) |
| ***F21S 41/32*** | (2018.01) |

(52) U.S. Cl.

CPC ........... *F21S 41/365* (2018.01); *F21S 41/147* (2018.01); *F21S 41/322* (2018.01)

(58) Field of Classification Search

CPC ...... F21S 41/322; F21S 41/151; F21S 41/153; F21S 41/663

See application file for complete search history.

(56) References Cited

U.S. PATENT DOCUMENTS

| | | | | |
|---|---|---|---|---|
| 7,156,544 | B2 * | 1/2007 | Ishida .................. | F21S 41/322 362/539 |
| 9,599,304 | B2 | 3/2017 | Brendle et al. | |

(Continued)

FOREIGN PATENT DOCUMENTS

| | | | |
|---|---|---|---|
| DE | 102012013841 | A1 | 5/2013 |
| DE | 102014200368 | A1 | 7/2015 |

(Continued)

OTHER PUBLICATIONS

International Search Report dated Nov. 16, 2021 in corresponding application PCT/EP2021/074755.

*Primary Examiner* — Robert J May

(74) *Attorney, Agent, or Firm* — Muncy, Geissler, Olds & Lowe, P.C.

(57) ABSTRACT

A lighting device for a motor vehicle having a multiplicity of light sources from which light radiates in operation of the lighting device, an optical component that has at least one light entry surface for the light radiating from the light sources and at least one light exit surface for the light that has entered through the at least one light entry surface, as well as a secondary optical system that has at least one light entry surface for the light radiating from the at least one light exit surface of the optical component as well as at least one light exit surface for the light that has entered through the at least one light entry surface, wherein the light that has exited from the at least one light exit surface of the secondary optical system produces a light distribution outside the motor vehicle in operation of the lighting device.

17 Claims, 3 Drawing Sheets

(56) References Cited

U.S. PATENT DOCUMENTS

| | | | | |
|---|---|---|---|---|
| 9,714,747 | B2 | 7/2017 | Tsukamoto | |
| 10,151,437 | B2 * | 12/2018 | Gromfeld ............ | F21S 41/143 |
| 10,895,357 | B2 | 1/2021 | Ishida et al. | |
| 10,955,102 | B1 | 3/2021 | Lee | |
| 11,530,791 | B2 | 12/2022 | Aubert et al. | |
| 2018/0073700 | A1 | 3/2018 | Orisich et al. | |
| 2018/0087735 | A1 | 3/2018 | Joerg et al. | |

FOREIGN PATENT DOCUMENTS

| | | | |
|---|---|---|---|
| DE | 102014210500 | A1 | 12/2015 |
| DE | 102015215200 | A1 | 2/2016 |
| DE | 102015224745 | A1 | 6/2017 |
| DE | 102017107781 | A1 | 10/2018 |
| DE | 102017206194 | A1 | 10/2018 |
| DE | 102017213103 | A1 | 1/2019 |
| DE | 102018209303 | A1 | 12/2019 |
| DE | 202020100605 | U1 | 3/2020 |
| DE | 102019107825 | A1 | 10/2020 |
| EP | 2789900 | A2 | 10/2014 |
| EP | 3179158 | A1 | 6/2017 |
| EP | 3388734 | A1 | 10/2018 |
| FR | 3056691 | A1 | 3/2018 |
| JP | 2017147153 | A | 8/2017 |
| WO | WO2020043443 | A1 | 3/2020 |

* cited by examiner

LIGHTING DEVICE FOR A MOTOR VEHICLE HEADLIGHT WITH A FIRST OPTICAL COMPONENT AND SECOND OPTICAL SYSTEM

This nonprovisional application is a continuation of International Application No. PCT/EP2021/074755, which was filed on Sep. 9, 2021, and which claims priority to German Patent Application No. 10 2020 124 423.1, which was filed in Germany on Sep. 18, 2020, and which are both herein incorporated by reference.

BACKGROUND OF THE INVENTION

Field of the Invention

The present invention relates to a lighting device for a motor vehicle, in particular a headlight for a motor vehicle.

Description of the Background Art

A lighting device of the abovementioned type is known from DE 10 2012 013 841 A1. The lighting device described therein is designed as a headlight and includes a multiplicity of light sources from which light radiates in operation of the lighting device. A light source that produces a low beam is designed as a laser diode here. Three additional light sources are designed as light-emitting diodes (LED) and serve to generate a high beam as well as a cornering light and/or a front fog light. The lighting device additionally includes a monolithic optical component, which has a light entry surface for each of the light-emitting diodes along with a common light exit surface designed as a lens. The low beam, the high beam, the cornering light, and the front fog light can be selectively switched on and off by controlling the light sources, by which means a corresponding light distribution is created outside the motor vehicle in operation of the lighting device.

SUMMARY OF THE INVENTION

It is therefore an object of the present invention to provide a lighting device with which the light distribution generated by the lighting device can be made more variable.

According to an exemplary embodiment, provision is made that the lighting device is designed such that a vertical light/dark boundary is produced in the light distribution by switching the lighting device from a first state in which all light sources emit light into a second state in which a multiplicity of the light sources emit light and one or more of the light sources do not emit light. In this way, a matrix light distribution can be generated with little effort. Particularly in the case of a monolithic design of the optical component, in some circumstances this results in a very flat construction that requires little adjustment effort.

Provision can be made that the multiplicity of the light sources are, at least in part, arranged side by side in a first direction. In this case, the multiplicity of light sources can be arranged in a first and a second group of light sources, wherein the two groups are spaced apart from one another, in particular in the first direction. The light sources can preferably be light-emitting diodes. As a result of arranging the light sources side by side, individual regions in the light distribution can be darkened by switching off individual light sources.

The possibility exists that the optical component has at least one reflecting surface, in particular a multiplicity of reflecting surfaces, at which the light that has entered through the at least one light entry surface is at least partially reflected toward the at least one light exit surface. In particular, the at least one reflecting surface in this case can be designed such that the light that has entered through the at least one light entry surface is reflected by total internal reflection. In this way, an intentional deflection of the light radiated from the light entry surface can take place in the interior of the optical component with simple means, wherein the losses can be minimized by the total reflection.

Provision can be made that one of the reflecting surfaces is associated with each one of the light sources so that the light radiating from a light source or one of the light sources is reflected from one of the reflecting surfaces. In particular, in this case the multiplicity of the reflecting surfaces can, at least in part, be arranged side by side in the first direction. The light radiating from one of the light sources is consequently passed on separately from the light of the other light sources so that a change in the light intensity that largely is only local can be achieved in the light distribution in the space outside by switching an individual light source on and off.

The possibility exists that the at least one reflecting surface is curved, in particular is concavely curved, preferably is curved in two mutually perpendicular directions. In this way, the divergence of the light radiating from a light entry surface or a light source can be reduced.

Like the light sources, the multiplicity of the reflecting surfaces can also be arranged in a first and a second group of reflecting surfaces, wherein the two groups are spaced apart from one another, in particular in the first direction.

Provision can be made that the at least one light entry surface of the secondary optical system is curved, in particular is convexly curved, preferably is designed with an aspheric curve, and/or that the at least one light exit surface of the secondary optical system is flat. In this way, the at least one light entry surface of the secondary optical system can project the light from the optical component appropriately into the space outside. Furthermore, a flat outer surface of the lighting device, in particular a flat front cover lens of the headlight, can be realized on account of the flat light exit surface, which may be desirable for reasons of design.

In particular, in this case the secondary optical system, in particular the at least one light entry surface of the secondary optical system, preferably together with the at least one light exit surface of the optical component, can project a plane that passes through the optical component in the region of the at least one reflecting surface onto a projection plane in which the light distribution is created in operation of the lighting device. In the region of the at least one reflecting surface, the light rays radiated from the individual light sources preferably are still separate from one another so that a projection of a plane from this region can ensure that the light of the individual light sources likewise is not overlapped and is arranged side by side in the light distribution in the space outside.

The possibility exists that a first and a second light exit surface of the optical component are provided that are arranged side by side, in particular in the first direction, and/or that a first and a second light entry surface of the secondary optical system are provided that are arranged side by side, in particular in the first direction. In this case, the first group of the light sources, together with the first group of the reflecting surfaces and the first light entry surface of the secondary optical system, and in particular together with the first light exit surface of the optical component, can form a first optical channel, and the second group of the light sources, together with the second group of the reflecting surfaces and the second light entry surface of the secondary optical system, and in particular together with the second light exit surface of the optical component, can form a second optical channel. Each of the optical channels can selectively transport the light from individual, separately controllable light sources in this case.

Provision can be made that the light of the first optical channel overlaps at least partially with the light of the second optical channel in the light distribution. In this way, a higher illumination intensity can be achieved in the center of the light distribution that is created.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The example of a lighting device according to the invention depicted in the figures are designed as headlights. The lighting device includes a multiplicity of light sources 1, which are designed as light-emitting diodes (LED) and from which light 2 is radiated in operation of the lighting device. The light sources 1 are individually or separately controllable.

Figure 4:
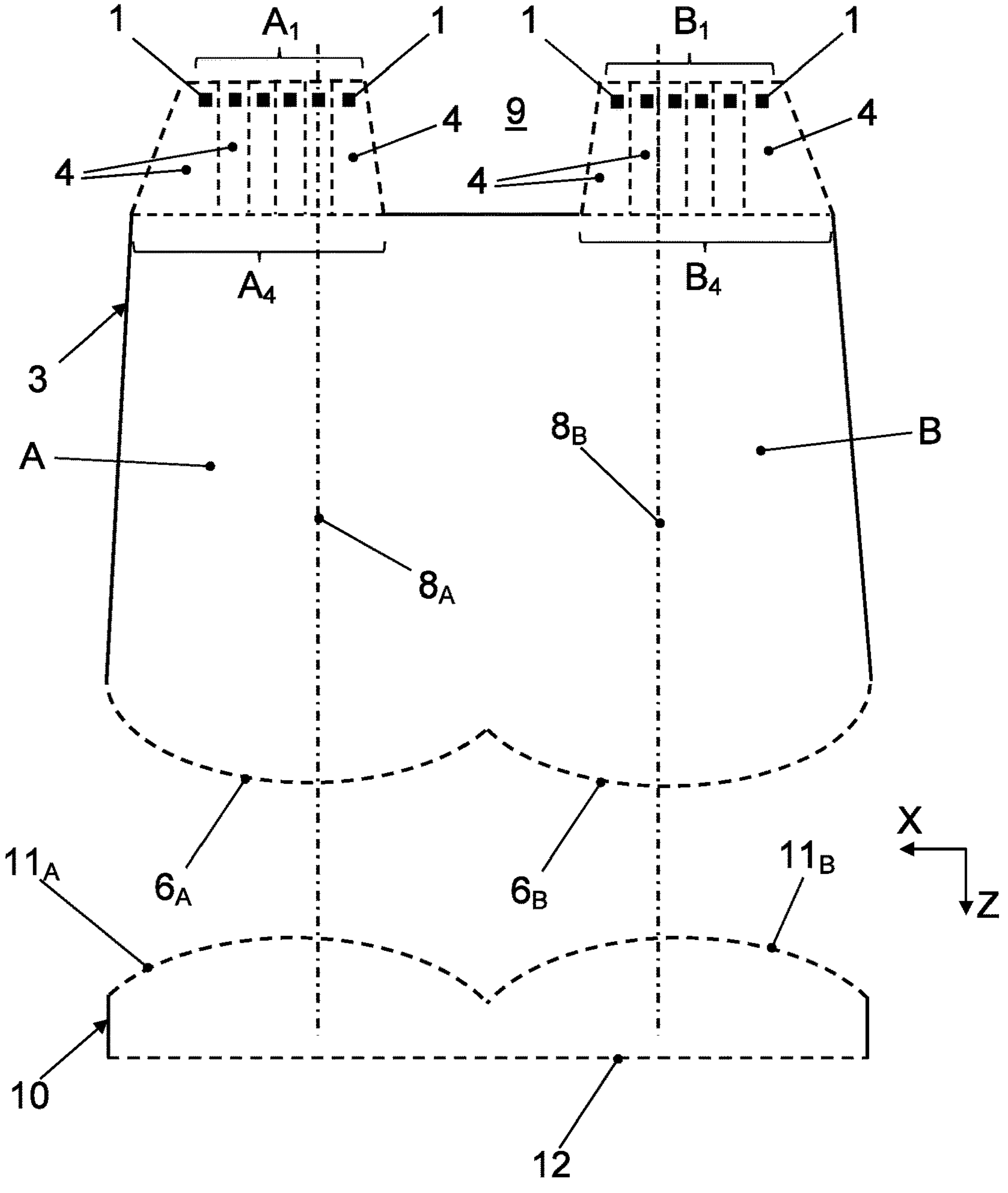
FIG. 4 is a top view of a schematically represented optical component, a secondary optical system, and multiple schematically represented light sources of an example of a lighting device according to the invention.

It is evident from FIG. 4 that the light sources 1 are divided into two groups $A_1$ and $B_1$, which are spaced apart from one another in a first direction X. Within the individual groups $A_1$, $B_1$, the individual light sources 1 are arranged side by side in the first direction X. In the exemplary embodiments shown, twelve light sources 1 are provided in all. It is entirely possible to provide more or fewer light sources 1.

Figure 1:
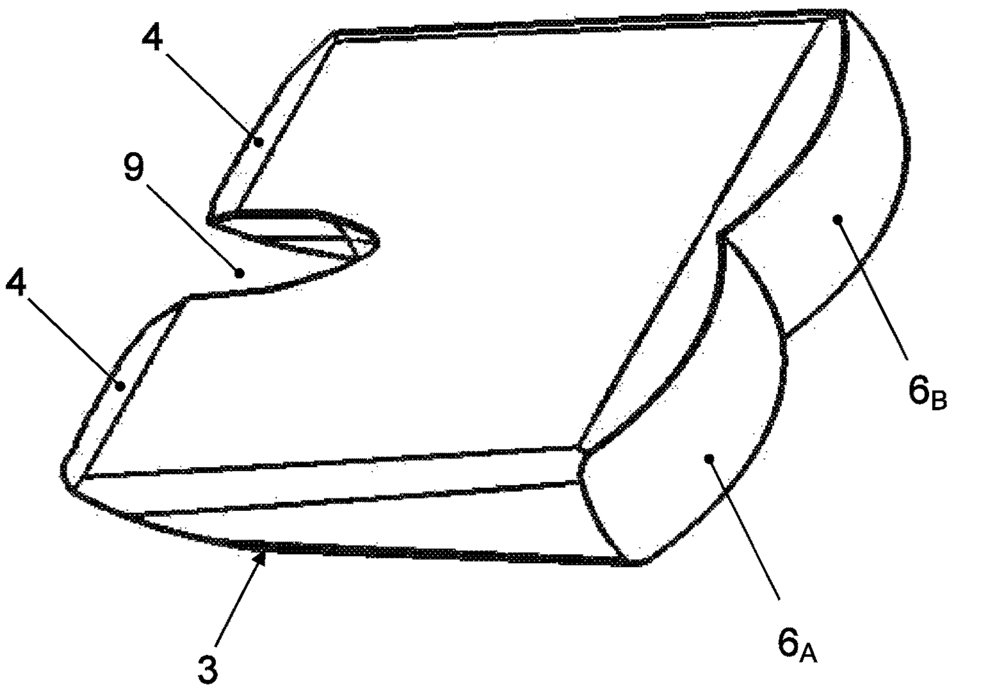
FIG. 1 is a perspective view of a schematically represented optical component of an example of a lighting device according to the invention.
Figure 3:
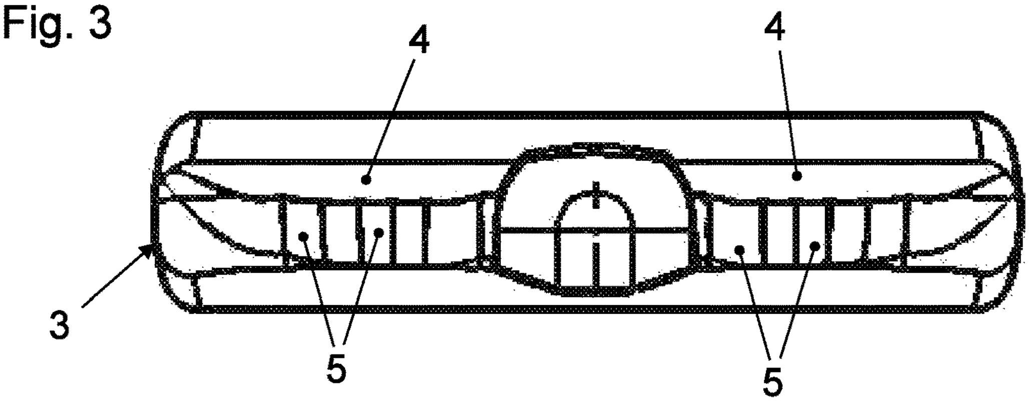
FIG. 3 is a rear view of the component according to FIG. 1.

The lighting device additionally includes a monolithic, transparent optical component 3, whose length and width are significantly greater than its height (in this regard, see FIG. 1 and FIG. 3, for example). The optical component 3 serves as primary optical system.

On its rear top, the optical component 3 has at least one, in particular a multiplicity of light entry surfaces 4 (see FIG. 4), through which the light 2 radiating from the light sources 1 can enter the optical component 3. In this case, the light entry surfaces 4, just like the light sources 1, are divided into two groups $A_4$ and $B_4$, which are spaced apart from one another in the first direction X. Within the individual groups $A_4$, $B_4$, the individual light entry surfaces 4 are arranged side by side. In this design, one of the light entry surfaces 4 is associated with each of the light sources 1 so that the light 2 radiating from the relevant light source 1 enters the associated light entry surface 4.

In FIG. 4, a total of twelve light entry surfaces 4 are indicated, which are schematically separated from one another in the respective group $A_4$, $B_4$ by dashed lines. In this case, a recess 9 of the optical component 3 is provided between the light entry surfaces 4 of the first group $A_4$ and the light entry surfaces 4 of the second group $B_4$. It is entirely possible for the individual light entry surfaces 4 in the two groups $A_4$, $B_4$ to adjoin one another with no transition so that an uninterrupted surface of the component 3 can be provided in the region of the respective group $A_4$, $B_4$ of light entry surfaces 4. In this way, each of the groups $A_4$, $B_4$ then has only one continuous light entry surface 4.

Figure 5:
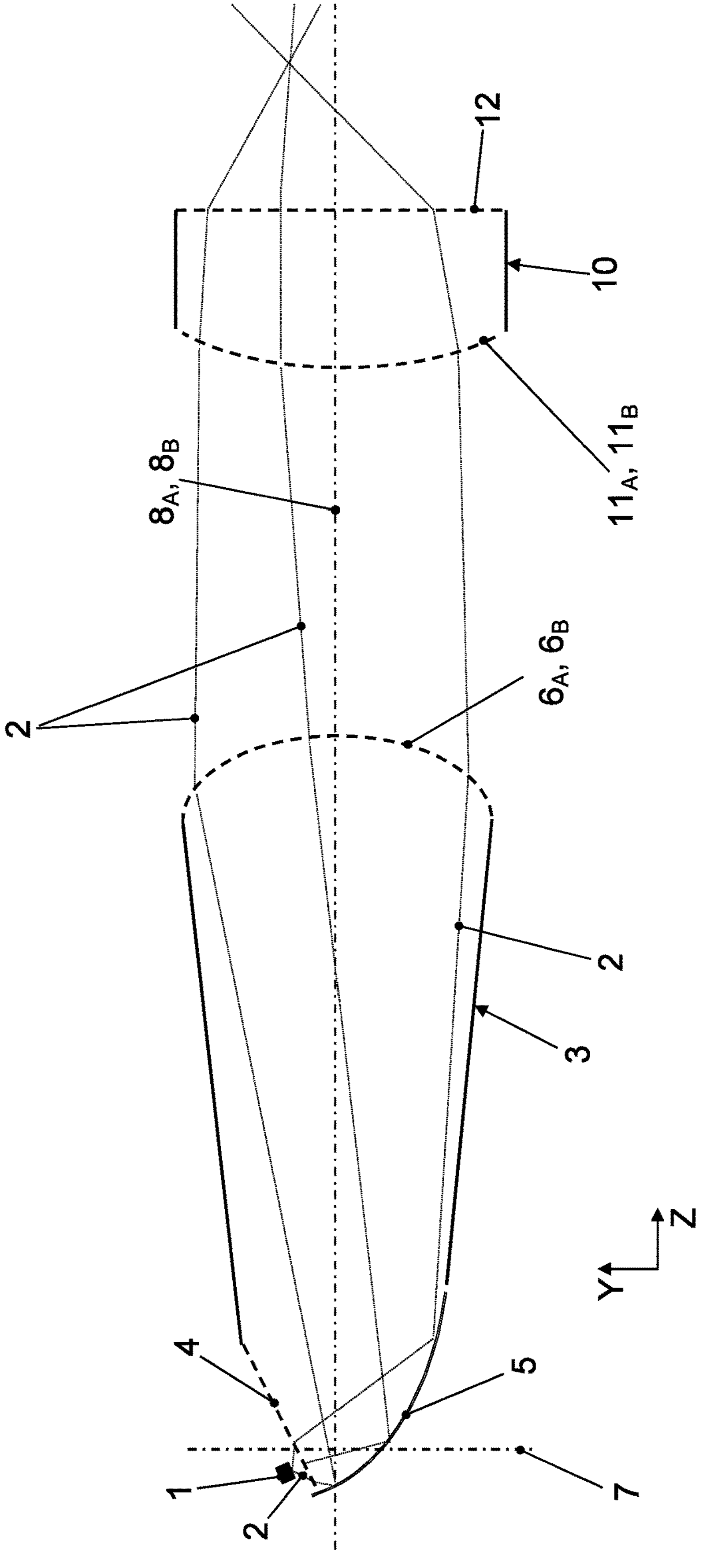
FIG. 5 is a side view of the component, of the secondary optical system, and of the light sources according to FIG. 4.

On its underside opposite the light entry surfaces 4, the optical component 3 has a multiplicity of reflecting surfaces 5 (see FIG. 2 and FIG. 5), from which the light 2 that has entered through the light entry surfaces 4 is reflected, in particular essentially to the right in FIG. 5 or essentially in the Z-direction. In this case, the reflecting surfaces 5, just like the light entry surfaces 4 and the light sources 1, are divided into two groups $A_5$ and $B_5$, which are spaced apart from one another in the first direction X. Within the individual groups $A_5$, $B_5$, the individual reflecting surfaces 5 are arranged side by side. In this case, one of the reflecting surfaces 5 is associated with each of the light sources 1 or each of the light entry surfaces 4 so that the light 2 radiating from the relevant light source 1 and that has entered through the corresponding light entry surfaces 4 arises on the associated reflecting surface 5.

The reflecting surfaces 5 are designed in such a manner or arranged in the optical component 3 in such a manner that the light 2 that has entered through the light entry surfaces 4 is reflected by total internal reflection. The reflecting surfaces 5 have a slight concave curvature with respect to both the X-direction and the Y-direction (see FIG. 2 and FIG. 5) so that the divergence of the light 2 radiating from the light entry surfaces 4 is reduced.

Figure 2:
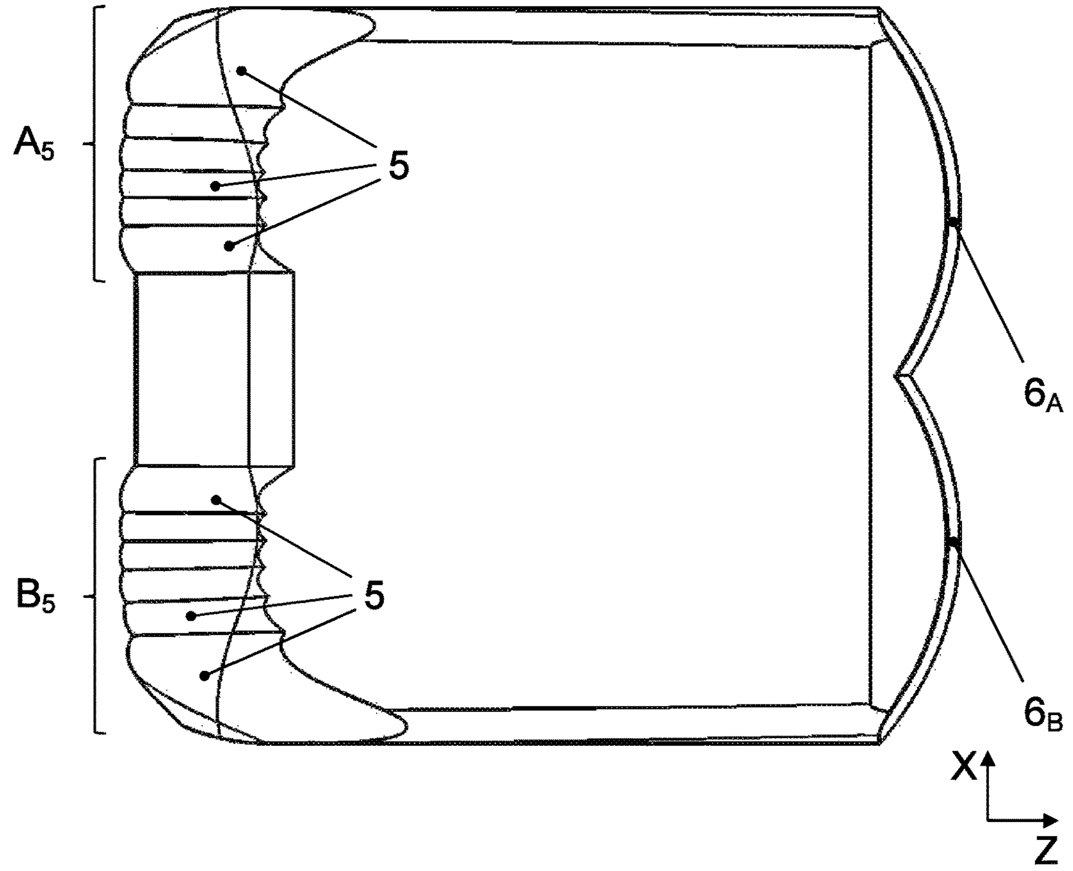
FIG. 2 is a bottom view of a schematically represented optical component of an example of a lighting device according to the invention.

On its front, the optical component 3 has two light exit surfaces 6A, 6B, through which the light 2 radiating from the reflecting surfaces 5 can exit the component 3 (see FIG. 2, FIG. 4, and FIG. 5). In this design, the light exit surfaces 6A, 6B are arranged side by side in the first direction X. Each one of the light exit surfaces 6A, 6B is curved.

The lighting device additionally includes a projection lens serving as secondary optical system 10, which is arranged after the optical component 3 in the direction of propagation of the light 2. The secondary optical system 10 has two light entry surfaces $\mathbf{11}_A$, $\mathbf{11}_B$ that are connected to one another for the light 2 radiating from the at least one light exit surface 6A, 6B of the optical component 3. In this design, the light entry surfaces $\mathbf{11}_A$, $\mathbf{11}_B$ are arranged side by side in the first direction X. Each one of the light entry surfaces $\mathbf{11}_A$, $\mathbf{11}_B$ is curved, in particular with an aspheric, convex curve. The secondary optical system 10 additionally has a flat light exit surface 12 for the light 2 that has entered through the at least one light entry surface $\mathbf{11}_A$, $\mathbf{11}_B$.

The secondary optical system 10, in particular the light entry surfaces $11_A$, $11_B$, projects or project a plane 7 that is parallel to an X-Y plane and that extends through the optical component 3 in the region of the reflecting surfaces 5 (see FIG. 5) onto a projection plane in the space outside the vehicle in which the light distribution is created in operation of the lighting device. In this case the light exit surfaces 6A, 6B of the optical component 3 can contribute to this projection into the space outside. In the region of the reflecting surfaces 5, the light rays radiating from the individual light sources 1 preferably are still separate from one another so that a projection of a plane 7 from this region can ensure that the light 2 of the individual light sources 1 likewise is not overlapped and is arranged side by side in the light distribution in the space outside.

The first light entry surface $11_A$ of the secondary optical system 10, together with the first group $A_1$ of the light sources 1, the first group $A_4$ of the light entry surfaces 4, and the first group $A_5$ of the reflecting surfaces 5, and if applicable the first light exit surface 6A of the optical component 3, forms a first optical channel A, whereas the second light entry surface $11_A$ of the secondary optical system 10 together with the second group $B_1$ of the light sources 1, the second group $B_4$ of the light entry surfaces 4, and the second group $B_5$ of the reflecting surfaces 5, and if applicable the second light exit surface 6B of the optical component 3, forms a second optical channel B (see FIG. 4). Each of the optical channels A, B can selectively transport the light 2 of the individual, separately controllable light sources 1 of the corresponding group $A_1$, $B_1$ of the light sources 1 in this case.

As a result of the described design of the optical component 3, the light 2 of the individual light sources 1 is arranged in the form of a light segment next to the light 2 of a relevant adjacent light source 1 in the light distribution to be created. A desired light distribution, for example with one or more vertical light/dark boundaries, can be created in the space outside the vehicle by selectively controlling the light sources 1. The edges between the reflecting surfaces 5 in this design form the vertical light/dark boundaries of the light segments in the projection plane. In particular, the light segment corresponding to one of the light sources 1 can be removed by switching off this light source 1, so that the light distribution in the region of this light segment has a reduced intensity or even, if applicable, no longer has any light intensity.

The light entry surfaces $11_A$, $11_B$ of the secondary optical system 10 and, if applicable, the light exit surfaces 6A, 6B of the optical component 3 are designed such that the light 2 passing through the two optical channels A, B overlaps, at least in a central region of the light distribution. In FIG. 4 and FIG. 5, the optical axes 8A, 8B of the light entry surfaces $11_A$, $11_B$ are drawn, which extend in the Z-direction of the coordinate system that is drawn. It is evident that the optical axis 8A of the first light exit surface $11_A$ extends in an X-Y plane that intersects one of the light sources 1 in the center, whereas the optical axis 8B of the second light exit surface $11_B$ extends in an X-Y plane that is arranged between two light sources 1.

As a result of this offset of the optical axes in the X-direction, it is possible to achieve the result that the width of the light segments is halved in the overlap region of the optical channels A, B.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting device for a motor vehicle, the lighting device comprising:

light sources from which light radiates in operation of the lighting device;

an optical component that has at least one light entry surface for the light radiating from the light sources as well as at least one light exit surface for the light that has entered through the at least one light entry surface; and a secondary optical system that has at least one light entry surface for the light radiating from the at least one light exit surface of the optical component as well as at least one light exit surface for the light that has entered through the at least one light entry surface, the light that has exited from the at least one light exit surface of the secondary optical system producing a light distribution outside the motor vehicle in operation of the lighting device, wherein the lighting device is designed such that a vertical light/dark boundary is produced in the light distribution by switching the lighting device from a first state in which all of the light sources emit light into a second state in which a plurality of the light sources emit light and one or more of the light sources do not emit light, wherein the light sources are arranged side by side in a first direction, wherein on a light entry side of the optical component, the optical component has a recess that divides the light entry side of the optical component into a first light entry portion and a second light entry portion, such that, with respect to the first direction, the first light entry portion is spaced apart from the second light entry portion by the recess, and wherein the light sources are arranged in a first group and a second group of light sources with the first group of light sources being associated with the first light entry portion of the optical component and the second group of light sources being associated with the second light entry portion of the optical component, such that the first group of light sources is spaced apart from the second group of light sources in the first direction.

2. The lighting device according to claim 1, wherein the light sources are light-emitting diodes.

3. The lighting device according to claim 1, wherein the optical component has at least one reflecting surface at which the light that has entered through the at least one light entry surface of the optical component is at least partially reflected toward the at least one light exit surface of the optical component.

4. The lighting device according to claim 3, wherein the at least one reflecting surface is designed such that the light that has entered through the at least one light entry surface of the optical component is reflected by total internal reflection.

5. The lighting device according to claim 3, wherein the at least one reflecting surface includes a plurality of reflecting surfaces, wherein each respective one of the plurality of reflecting surfaces is associated with a respective one of the light sources so that the light radiating from each respective one of the light sources is reflected from a respective one of the plurality of reflecting surfaces.

6. The lighting device according to claim 5, wherein the plurality of reflecting surfaces are arranged in a first group and a second group of reflecting surfaces, wherein the first and second groups are spaced apart from one another or spaced apart form one another in the first direction by the recess, with the first group of reflecting surfaces being provided in the first light entry portion of the optical component and the second group of reflecting surfaces being provided in the second light entry portion of the optical component.

7. The lighting device according to claim 3, wherein at least a portion of the plurality of reflecting surfaces are arranged side by side in the first direction.

8. The lighting device according to claim 3, wherein the at least one reflecting surface is curved or is concavely curved or is curved in two mutually perpendicular directions.

9. The lighting device according to claim 3, wherein the at least one light entry surface of the secondary optical system together with the at least one light exit surface of the optical component projects a plane, that passes through the optical component in a region of the at least one reflecting surface, onto a projection plane in which the light distribution is created in operation of the lighting device.

10. The lighting device according to claim 1, wherein the at least one light entry surface of the secondary optical system is curved or is convexly curved or is designed with an aspheric curve, and wherein the at least one light exit surface of the secondary optical system is flat.

11. The lighting device according to claim 1, wherein the at least one light exit surface of the optical component includes a first light exit surface and a second light exit surface that are arranged side by side in the first direction and/or wherein the at least one light entry surface of the secondary optical system includes a first light entry surface and a second light entry surface that are arranged side by side in the first direction.

12. The lighting device according to claim 11, wherein the optical component has at least one reflecting surface at which the light that has entered through the at least one light entry surface of the optical component is at least partially reflected toward the at least one light exit surface of the optical component, wherein the at least one reflecting surface includes a plurality of reflecting surfaces, wherein the plurality of reflecting surfaces are arranged in a first group and a second group of reflecting surfaces, wherein the first group of light sources, the first group of reflecting surfaces, the first light entry surface of the secondary optical system and the first light exit surface of the optical component forms a first optical channel, and wherein the second group of light sources, the second group of reflecting surfaces, the second light entry surface of the secondary optical system and the second light exit surface of the optical component forms a second optical channel.

13. The lighting device according to claim 12, wherein light of the first optical channel overlaps at least partially with light of the second optical channel in the light distribution.

14. The lighting device according to claim 1, wherein the lighting device is a headlight for the motor vehicle and the optical component is monolithic.

15. The lighting device according to claim 1, wherein the recess is devoid of light sources.

16. The lighting device according to claim 1, wherein the at least one light entry surface of the secondary optical system includes a first light entry surface and a second light entry surface that are arranged side by side in the first direction.

17. The lighting device according to claim 16, wherein the first light entry surface of the secondary optical system faces in a direction towards the first light entry portion of the optical component and the second light entry surface of the secondary optical system faces in a direction towards the second light entry portion of the optical component, and wherein an optical axis of the first light entry surface of the secondary optical system extends so as to intersect one of the light sources in the first group of light sources and an optical axis of the second light entry surface of the secondary optical system extends between two of the light sources in the second group of light sources.

* * * * *